United States Patent
Lunt

(10) Patent No.: US 7,408,706 B2
(45) Date of Patent: Aug. 5, 2008

(54) NEUTRAL WHITE-LIGHT FILTER DEVICE

(75) Inventor: David Lunt, Tucson, AZ (US)

(73) Assignee: Meade Instruments Corp., Irvine, CA (US)

( * ) Notice: Subject to any disclaimer, the term of this patent is extended or adjusted under 35 U.S.C. 154(b) by 0 days.

(21) Appl. No.: 11/800,847

(22) Filed: May 8, 2007

(65) Prior Publication Data

US 2007/0211359 A1    Sep. 13, 2007

Related U.S. Application Data

(62) Division of application No. 10/917,740, filed on Aug. 13, 2004, now Pat. No. 7,230,754.

(60) Provisional application No. 60/495,659, filed on Aug. 15, 2003.

(51) Int. Cl.
*G02B 5/04* (2006.01)
*G02B 23/00* (2006.01)
*G02B 27/10* (2006.01)

(52) U.S. Cl. .................. 359/399; 359/431; 359/638; 359/639; 359/834; 359/836

(58) Field of Classification Search .............. 359/495, 359/496, 634, 638, 639, 834, 835, 836, 837, 359/399, 431
See application file for complete search history.

(56) References Cited

U.S. PATENT DOCUMENTS

| | | | |
|---|---|---|---|
| 3,677,621 A * | 7/1972 | Smith | 359/487 |
| 4,088,410 A * | 5/1978 | Smith | 356/390 |
| 4,502,783 A * | 3/1985 | Lau et al. | 356/152.3 |
| 4,702,603 A | 10/1987 | Augustyn | |
| 4,804,264 A * | 2/1989 | Kirchhofer et al. | 356/44 |
| 4,844,593 A * | 7/1989 | Parker et al. | 359/497 |
| 4,930,894 A * | 6/1990 | Baldwin | 356/485 |
| 5,172,186 A * | 12/1992 | Hosoe | 356/493 |
| 5,187,543 A * | 2/1993 | Ebert | 356/487 |
| 5,446,710 A * | 8/1995 | Gardner et al. | 369/44.14 |
| 5,596,410 A * | 1/1997 | Hantel et al. | 356/493 |
| 6,163,379 A * | 12/2000 | de Groot | 356/493 |
| 6,529,327 B1 * | 3/2003 | Graindorge | 359/566 |
| 7,230,754 B2 * | 6/2007 | Lunt | 359/399 |

FOREIGN PATENT DOCUMENTS

FR    1358363    3/1964

* cited by examiner

*Primary Examiner*—Ricky D Shafer
(74) *Attorney, Agent, or Firm*—Antonio R. Durando

(57) ABSTRACT

A substantially neutral filter across the white-light spectrum is obtained by minimizing the wavelength-dependent effects of filtering components and of reflective coatings on surfaces. The incoming light is captured by a first prism and directed toward the interface formed by the optical contact of a second prism with a face of the first prism, where the light is partially reflected internally and partially transmitted into the second prism. The reflected light is further reflected internally and directed toward the image surface out of the first prism. The fraction of light transmitted into the second prism is reflected back and redirected out of the system toward the incoming beam. The amount of energy directed toward the image plane is controlled by the judicious selection of the refractive indices in the two materials at the contacting interface of the first and second prisms. The second prism consists of a retro-reflector element adapted to reflect substantially all light transmitted at the interface with the first prism back along the optical path of the incoming beam.

2 Claims, 6 Drawing Sheets

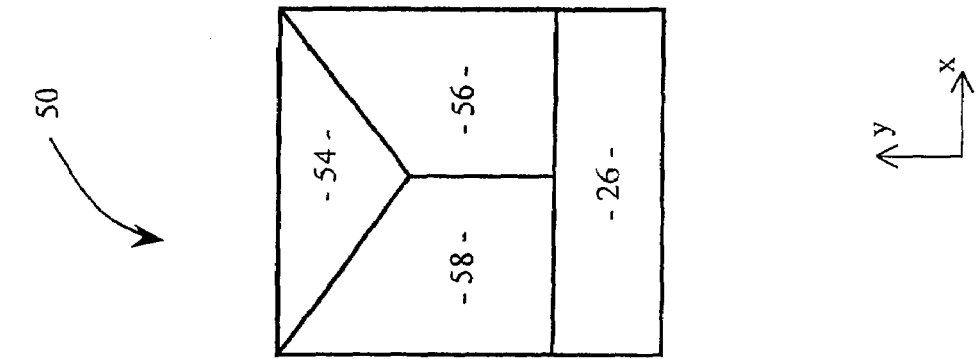
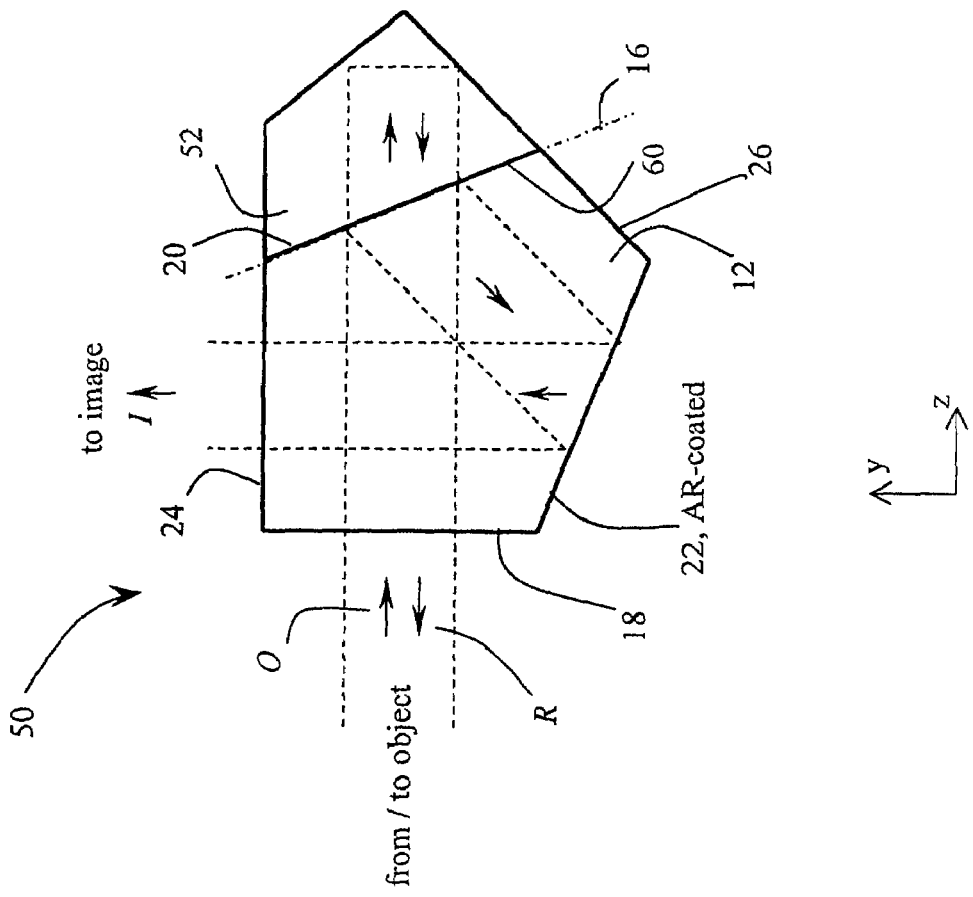
Fig. 3A
Fig. 3B

NEUTRAL WHITE-LIGHT FILTER DEVICE

RELATED APPLICATIONS

This application is a divisional application of Ser. No. 10/917,740, filed Aug. 13, 2004 now U.S. Pat. No. 7,230,754, which was based on U.S. Provisional Serial No. 60/495,659, filed Aug. 15, 2003.

BACKGROUND OF THE INVENTION

1. Field of the Invention

This invention relates to high-quality neutral-density filters and, in particular, to a neutral white-light filter constructed with a novel prism arrangement that is particularly suited for telescopic applications.

2. Description of the Prior Art

In telescopic solar astronomy, objects must be observed using optical filters that reduce the intensity of the light, especially at infrared and ultraviolet wavelengths. The human eye is particularly susceptible to damage from exposure to IR and UV wavelengths because they produce extremely harmful chemical and thermal effects on the retina, respectively. Therefore, when human observation of an incoming image is desired in an instrument such as a telescope, it is necessary to attenuate these wavelengths below acceptable levels. In the case of white light, attenuation by a factor of at least $10^{-5}$ is considered safe. Thus, the use of appropriate filters is extremely important for observation of very bright objects such as the sun Neutral-density filters are defined as filters capable of attenuating a wavefront uniformly across the spectrum of visible light. In practice, these filters are implemented with combinations of optical components, each affecting a different spectral range, which therefore can only approximate neutral-density performance. In telescopes, where attenuation is desired throughout the entire white-light spectral range, it is usually obtained using a Herschel wedge in combination with additional filtering elements. As is well known in the art, a Herschel wedge operates in reflection, diverting about 5% of the incoming light toward the optical path of the observable beam, which is then further attenuated with filters to achieve a safe level for human observation. The transmitted beam, which constitutes about 95% of the incoming light, is either absorbed as heat by the telescope mass, typically in a refrigerated heat-sink component, or is dumped as an outgoing beam through an opening in the housing of the telescope.

Thus, the Herschel-wedge solution is unsatisfactory in at least two respects. From a functional viewpoint, the use of additional filters in the optical path of the observable beam to attenuate it to safe levels introduces undesirable spectral and optical non-uniformities; that is, the cumulative filter effect is not spectrally neutral and the quality of the image-forming wavefront is degraded. In addition, since most neutral-density filters use metallic layers (such as aluminum, silver or gold coatings) which heat up during use, the wedge assembly is not thermally stable. From an operational point of view, the fact that most of the energy of the incoming light has to be absorbed by the system increases the thermal-stability problems and requires expensive and cumbersome cooling units. When the transmitted beam is dissipated in the surrounding environment, the highly concentrated energy dumped by the beam represents a serious health hazard to anyone accidentally encroaching and blocking its path in the vicinity of the telescope.

Therefore, any filter capable of producing a neutral attenuation of a light beam across the white-light spectrum (for the purposes of this disclosure defined as the spectral range from about 200 to about 1,600 nm) and operable without excessive thermal effect would represent a very desirable advance in the art. This invention achieves these goals with optical filters based on a variety of prism arrangements adapted to split the incident light into a useful portion directed toward the observer (or image-plane surface) and a rejected portion reflected toward the incoming beam.

SUMMARY OF THE INVENTION

This invention produces a substantially neutral filter across the white-light spectrum by minimizing the wavelength-dependent effects of filtering components and of reflective coatings on surfaces. The incoming light is captured by a first prism and directed toward the interface formed by the optical contact of a second prism with a face of the first prism, where the light is partially reflected internally and partially transmitted into the second prism. The reflected light is further reflected internally and directed toward the image surface (or an observer) out of the first prism. The fraction of light transmitted into the second prism is reflected back and redirected out of the system toward the incoming beam.

According to one aspect of the invention, the amount of energy directed toward the observer (or the image surface of the instrument) is controlled by the judicious selection of the refractive indices in the two materials at the contacting interface of the first and second prisms. The beam internally reflected at the interface can be so attenuated by a factor in the order of $10^{-3}$ or less of the incoming light with substantially uniform spectral effects across the entire white-light band. By reflecting again the beam internally with a coating or in similar fashion with another prism, the observable light can be further attenuated to well below the $10^{-5}$ level normally considered safe and acceptable in the industry without material deterioration of the spectral uniformity of the incoming light. Thus, the invention provides a solution to the problem of spectral non-uniformity created by the prior-art use of multiple filter components to reduce the observable light intensity to acceptable levels. To the extent that the use of metal coatings is either greatly reduced or eliminated, the prior-art thermal-instability problems are also effectively overcome.

According to another aspect of the invention, the second prism consists of a retro-reflector element adapted to reflect substantially all light transmitted at the interface with the first prism back along the optical path of the incoming beam. Since, as a result of the proper selection of their respective indices of refraction, an excess of 99% of the incoming light is transmitted at the interface between the two prisms, most of the light is returned toward the incoming beam and its energy is dissipated in the atmosphere. Thus, the invention also provides a solution to the prior-art hazards and thermal problems associated with the dissipation of the unused portion of the energy absorbed by the system or dumped outside the system toward the user.

In the preferred embodiment of the invention, the first prism consists of a conventional pentaprism. The second prism is a conventional right-angle roof prism or a corner-cube reflector. Other embodiments are contemplated within the concepts of the invention, including an appropriately shaped generic second prism, or, alternatively, a reflective element aligned with the beam transmitted out of the first prism. In the most preferred embodiment, a third prism with a suitable index of refraction is used to produce the second internal reflection of the useful beam within the first prism.

Various other aspects and advantages of the invention will become clear from the description in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

BRIEF DESCRIPTION OF THE DRAWINGS

FIG. 3A is a side elevational view of a third prism assembly according to the invention.

FIG. 3B is a back elevational view of the prism assembly of FIG. 3A.

DETAILED DESCRIPTION OF THE INVENTION

This invention is based on the general idea of using internal reflection in a prism to provide a greatly attenuated portion of an incoming beam at the image surface of an instrument. In addition, a retro-reflection component is utilized to redirect the unused portion of the light back out of the system along the optical path of the incoming beam.

For the purposes of this disclosure, the term "neutral" is used with reference to spectral properties to mean substantially uniform across the white-light wavelength band. That is, a neutral filter is one that maintains the spectral properties of the incident beam substantially unchanged uniformly across the spectral range of interest. "Optical surface" refers to any of the reflective or transmissive surfaces constituting the device of the invention. The terms "face" and "facet" are used interchangeably to refer to each of the plane surfaces of an optical structure. An "optical structure" is defined as any structure with refractive and transmissive properties, as well as with facets that constitute optical surfaces. With reference to all figures, the light from an object is considered incident on the front surface of the filter, and the optical path of the light through the system is denoted with dashed lines, as customary in the art. The incoming light is propagated in the z direction.

Figure 1B:
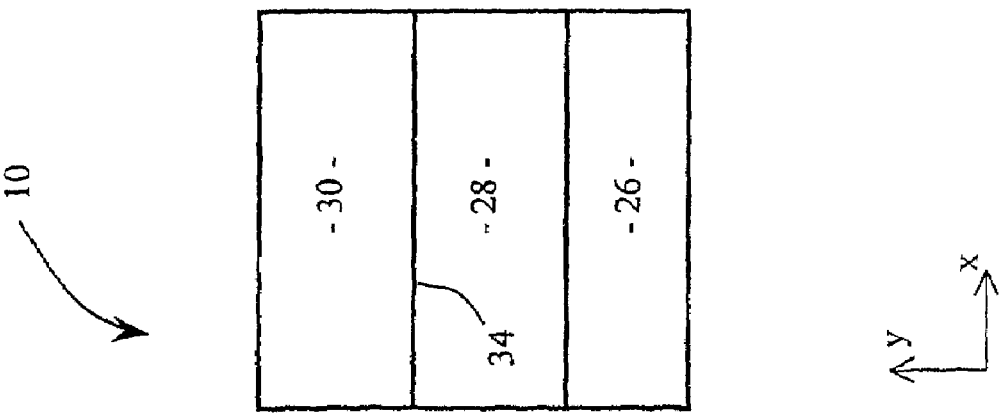
FIG. 1B is a back elevational view of the prism assembly of FIG. 1A.
Figure 1A:
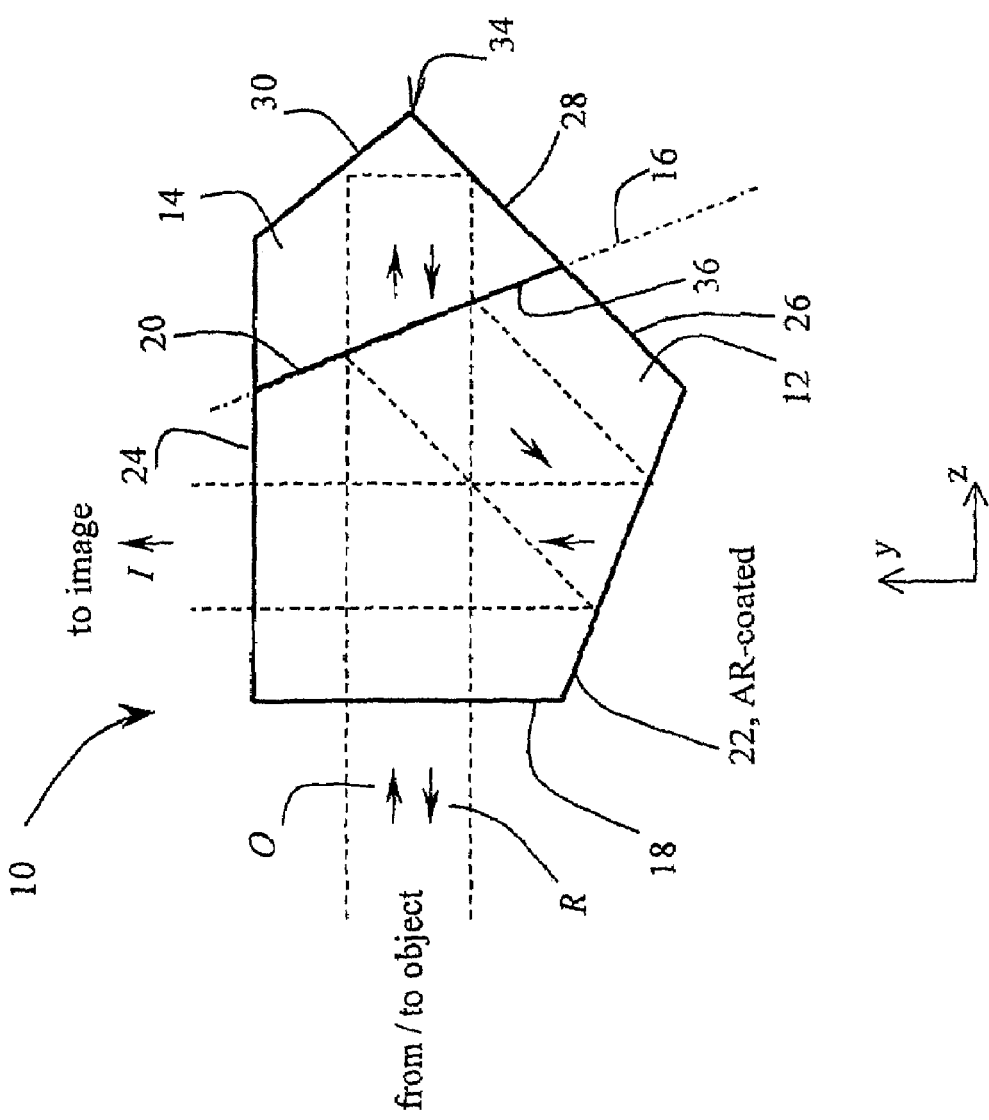
FIG. 1A is a side elevational view of a prism assembly according to the invention.

Referring to the figures, wherein like parts are designated throughout with the same reference numerals and symbols, FIGS. 1A and 1B illustrate a filter assembly 10 according to the invention in side and back elevational views, respectively. The filter assembly includes first and second prism components 12 and 14, respectively, which are optically attached at respective parallelogram faces along a common plane 16. The prism 12 is preferably a conventional pentagonal-roof prism (referred to as a "pentaprism") with two parallel pentagonal faces and five parallelogram faces, namely a front face 18, two side faces 20 and 22, an end face 24 and a bottom face 26. The side face 22 of the prism 12 is AR-coated to required specifications to reflect a portion of the light received internally toward the end face 24.

The prism 14 is a conventional right-angle roof prism used to provide total retro reflection of the light transmitted from prism 12. Thus, as well understood in the art, prism 14 includes two parallelogram facets 28 and 30 disposed at right angle to form a reflective roof so that the roof-line 34 between them is perpendicular to the pentagonal faces of the pentaprism 12 (that is, parallel to the x-axis in the figures). The parallelogram facet 36 of the retro-reflection prism 14 is optically in contact with the side face 20 of the pentaprism 12, thereby creating an interface along the plane 16 that produces a reflection of impinging light which, as those skilled in the art readily understand, depends on the relative values of the indices of refraction of the pentaprism 12 and the retro-reflection prism 14. Therefore, these values can be judiciously selected to produce the desired attenuation in the reflected beam. Since this beam does not interact with any coating or other filtering element, the spectral characteristics of the reflected beam remain substantially unchanged across its waveband, thereby providing a neutral filtering effect.

Thus, an incoming light beam O received from an object, preferably incident with a zero angle of incident upon the front face 18 of the filter assembly 10 along the z-axis (as illustrated in the figures), propagates through the body of the prism 12 towards its face 20. According to well know pentaprism operation, a fraction of the light O is reflected twice internally (first at face 20 and then at face 22) in accordance with Snell's law of reflection, thereby providing the portion of light I delivered to an observer or an image surface through the end face 24. The remaining fraction of light is refracted at the interface of face 20 and facet 36, and is transmitted toward the right-angle roof of the retro-reflection prism 14. The roof of the prism 14 acts as a retro-reflector and, as is well understood, it re-directs essentially all of the incident light back along its optical path through the faces 36 and 20 of the two prisms. The light so re-directed constitutes the rejected beam R that exits the system towards the object through the front face 18 of the prism 12.

According to the invention, the refractive indices of the materials constituting prisms 12 and 14 are chosen to be sufficiently close to one another at the design wavelength of the system to provide an extremely low reflection coefficient at face 16 without the use of any optical coating between the prisms. In addition, some applications (such as solar observing) may result in the device being operated at elevated temperatures. Thus, materials with low coefficients of thermal expansion may also be preferred to ensure the thermal stability of the prism assembly. (Conventional optical glasses are known to possess rather high coefficients of thermal expansion; thus, they cannot be used in practice.) For example, the prism 12 may be fabricated from fused silica (with refractive index $n_{12}$=1.485 at 589 nm) and the prism 14 may be made of glass-ceramic material such as ClearCeram™ ($n_{14}$=1.55 at 589 nm) available from Ohara Corporation of Japan. This choice of materials, together with a basic quarter-wave AR-coating on face 22 of the pentaprism (for example, magnesium fluoride —$MgF_2$) or a well-known broad-band AR-coating (BBAR), produces irradiance levels in the output beam I on the order of $10^{-5}$ of the incident amount of light O, which is safe and sufficient for solar observing. In a similar implementation (not shown), the roof-prism 14 may be oriented with equivalent results such that the roof-line 34 is parallel to the y-axis (i.e., vertical in use).

Figure 2B:
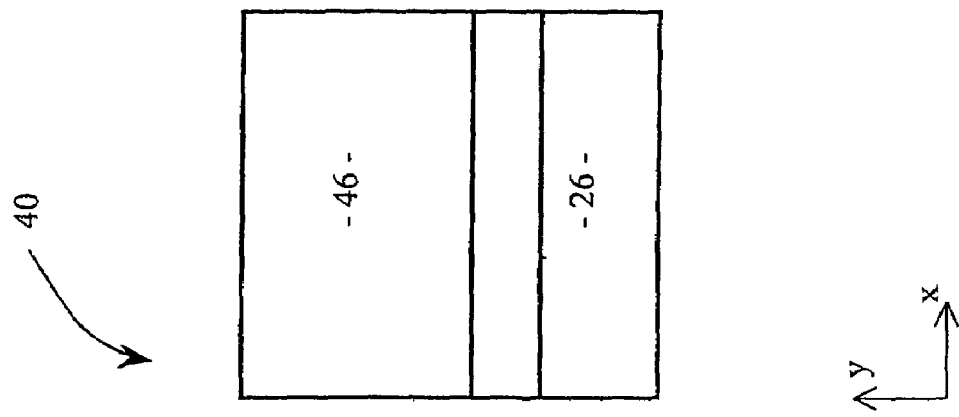
FIG. 2B is a back elevational view of the prism assembly of FIG. 2A.
Figure 2A:
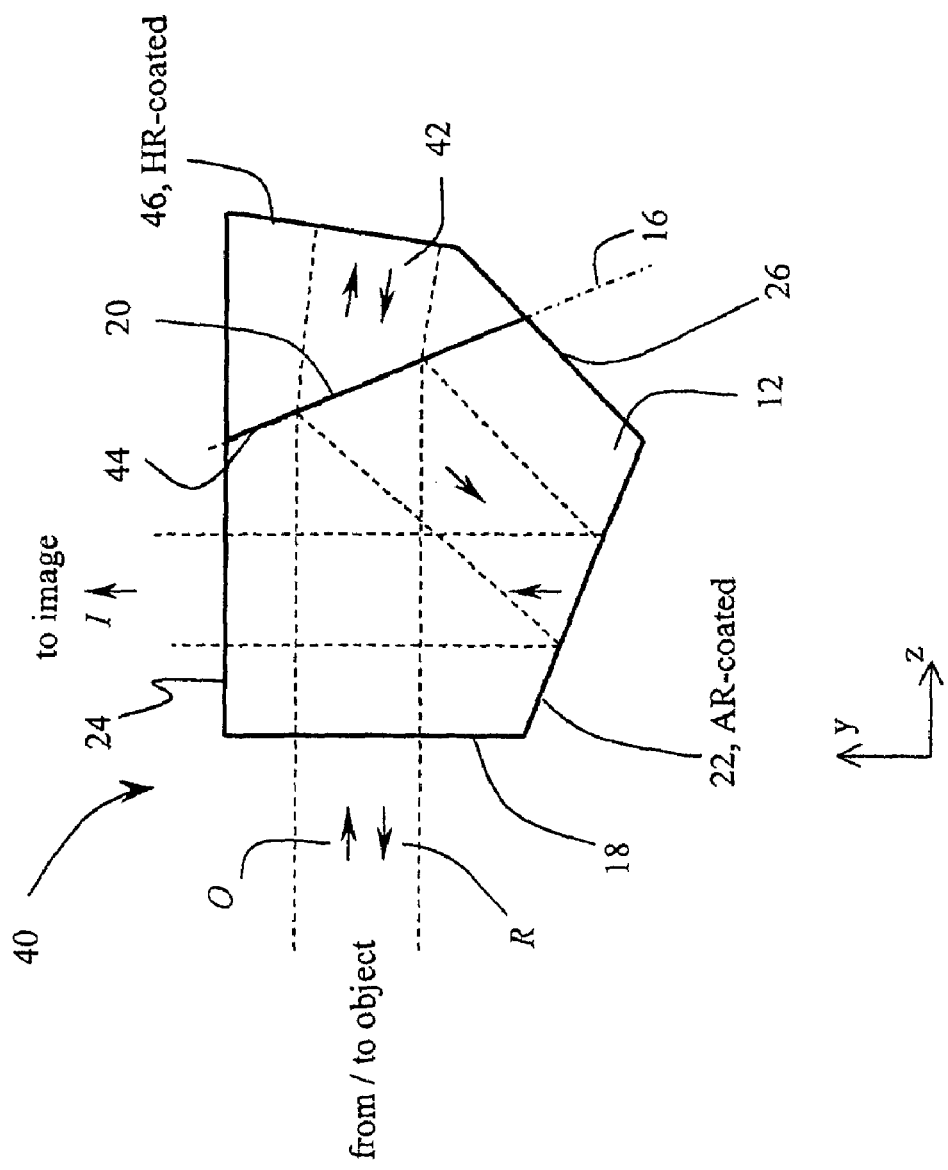
FIG. 2A is a side elevational view of another prism assembly according to the invention.

An alternative embodiment 40 of the optical-filter assembly of the invention is shown in FIGS. 2A and 2B, in side and back views, respectively. The filter assembly 40 consists of the same pentaprism 12 of FIG. 1A combined with a rejecting prism 42 optically adjoined along respective contacting face 20 and facet 44. The pentaprism 12 operates in a fashion analogous to that described with reference to FIGS. 1A and 1B, delivering a safe level of light I to the observer or the image surface through the end face 24. The fraction of incident light that is transmitted through the interface between the prisms is reflected back along its optical path by a back facet 46 that is substantially perpendicular to the direction of propagation of the refracted light and is coated for high-reflection performance across the white-light portion of the spectrum. The geometry of the prism 42 is selected so as to ensure that the incident light is reflected back along the optical path of the incoming light O. Thus, most of the light O is reflected towards the object as a rejected beam R.

In fabrication, the material refractive indices of prisms 12 and 42 are again chosen to be sufficiently close to one another at the design wavelengths of the instrument to provide extremely low reflection coefficients at the interface of faces 20 and 44 without any additional optical coatings between the prisms. For example, fused silica and ClearCeram materials may be used, as in the example of the previous embodiment.

Another embodiment 50 of an optical-filter assembly according to the invention is shown in side and back views, respectively, in FIGS. 3A and 3B. Just as in the embodiment described with reference to FIG. 1A, this filter assembly consists of the pentaprism 12 and a rejecting prism 52 in the form of a corner-cube reflector, which is well known in the art. FIG. 3B shows one particular orientation of the corner-cube reflector 52 with respect to the coordinate system used in the drawings, but the exact orientation of the back facets 54,56 and 58 of the corner-cube reflector 52 does not affect the performance of the prism. The filter operates in the same fashion as the one described above with reference to FIGS. 1A and 1B; that is, the prism 52 retro-reflects the fraction of light transmitted through the contacting faces 20 and 60, thereby rejecting it outside the optical system towards the object. Again, the material refractive indices of prisms 12 and 52 are selected to be sufficiently close to one another at the design wavelengths to provide very low reflection coefficients at the interface without additional optical coatings. For example, fused silica and ClearCeram™ materials may be used, as in the previous examples.

Figure 4:
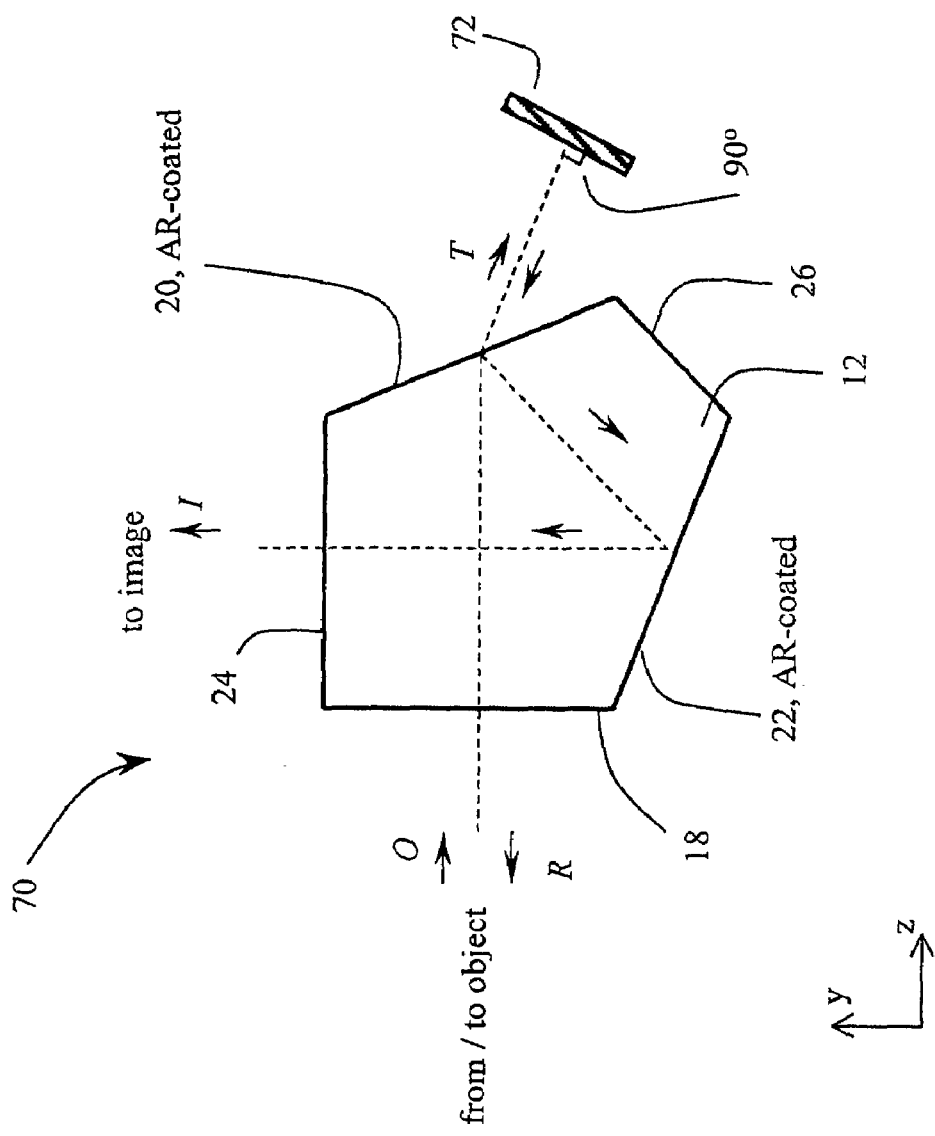
FIG. 4 is a side elevational view of yet another prism assembly according to the invention wherein a prism is replaced with a reflective surface.

A different embodiment 70 of the invention is illustrated in side view in FIG. 4. A conventional pentaprism 12 is combined with an external reflective element, such as a mirror 72, to constitute the filter assembly. The pentaprism may be made of any appropriate optical material with both side faces 20 and 22 coated for anti-reflection to deliver a safe level of irradiance, as desired, in the beam I to the observer. The highly reflective mirror 72 is appropriately positioned to retro-reflect the fraction of light T transmitted through the face 20 of the pentaprism, thereby producing a rejected beam R that returns towards the object through the pentaprism. While this embodiment of the invention is not preferred because of the spectral non-uniformities in the filter produced by the additional coatings, it is still useful within more limited spectral bands, such as visible light. Therefore, because of its simplicity and thermal stability, this embodiment is preferable to prior-art filters.

Figure 5:
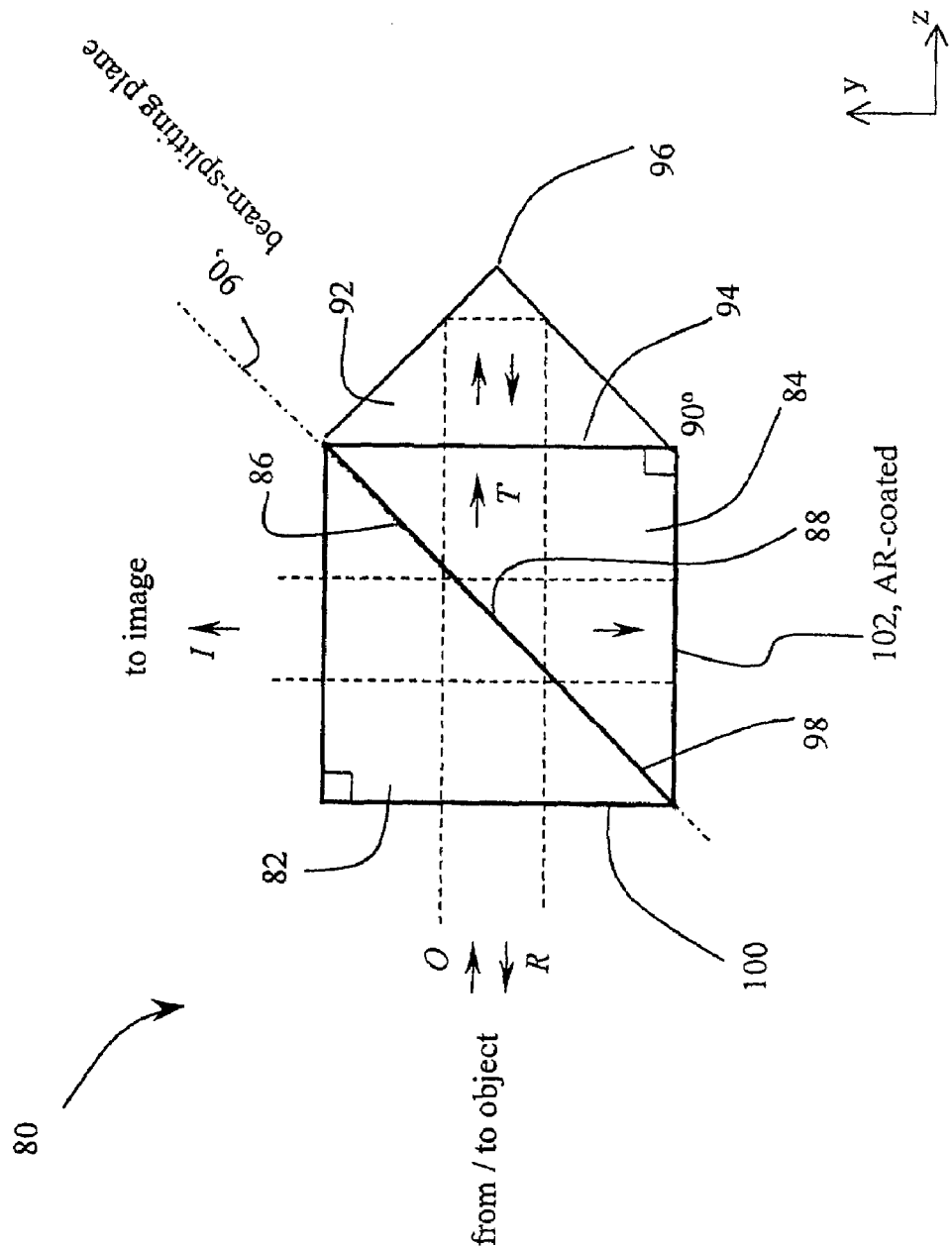
FIG. 5 is a side elevational view of a prism assembly according to the invention wherein a prism is replaced with a beam-splitting cube.

In yet another embodiment 80 of the invention, the filter assembly consists of the combination of three prisms, as shown in side view in FIG. 5. Two right-angle prisms 82 and 84 are optically adjoined along their respective hypotenuse faces 86,88, thereby forming a beam-splitter cube with a beam-splitting plane 90. The hypotenuse of a right-angle-roof rejecting prism 92 is optically attached to the back face 94 of the beam-splitter cube and is oriented with its roof-line 96 parallel to the x-axis (i.e., horizontal in use). (As in the case of the embodiment of FIGS. 1A and 1B, an orthogonal orientation may be used as well.) In practice, the prisms 82 and 84 may or may not be made of different materials, while the prism 84 and the rejecting prism 92 are preferably made of the same material. As in the previously described embodiments, the materials of choice are fused silica for prism 82 and either fused silica or ClearCeram™ or other conventional optical material for prisms 84 and 92. Thus, in the case when prisms 82,84 are made of different material, the difference in the refractive indices of the materials at the beam-splitting plane 90 is used to produce a greatly attenuated image beam I on reflection. An appropriate AR-coating 98 may also be provided between the prisms 82 and 84, especially when they are made of the same material, as illustrated, to decrease the amount of light reflected at the interface.

In operation, the light O from the object is incident upon the front face 100 of the cube and is partially reflected and partially transmitted at the beam-splitting plane 90. The reflected fraction of light is delivered directly towards the image plane or observer as the beam I, while the transmitted fraction T propagates on and is retro-reflected by the roof of the prism 92 back along its original optical path. The majority of the retro-reflected light (at least 99%, depending on the materials and/or coatings used) exits the optical system towards the object as the rejected beam R, while the residual light exits the filter through the bottom face 102, which may or may not need to be AR-coated.

Figure 6:
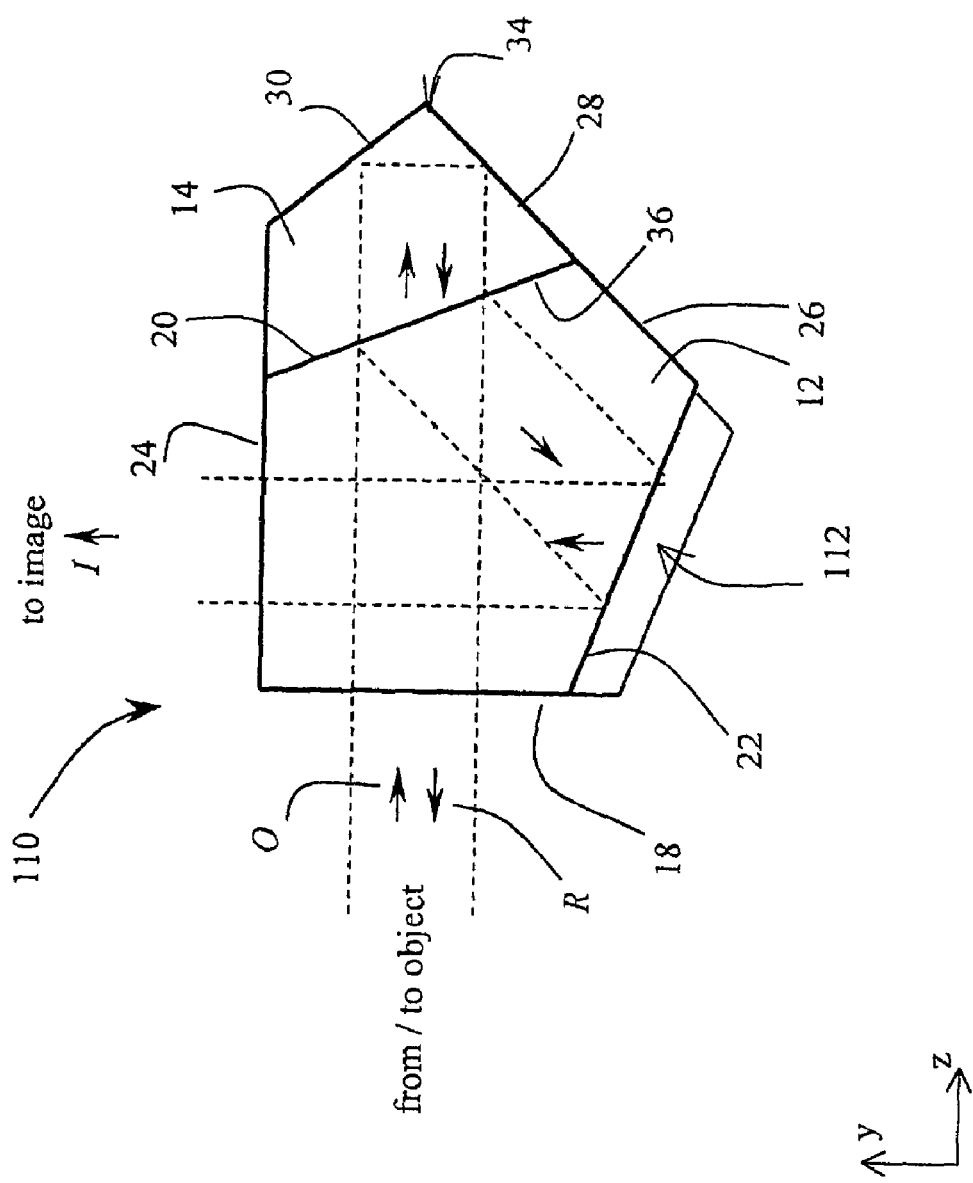
FIG. 6 is an illustration of the preferred embodiment of the invention, wherein the image beam is produced solely by reflections at the interface between transmissive media.

In the preferred embodiment of the invention, the filter assembly of FIGS. 1A and 1B is combined with an additional optical-plate element to improve its performance at the reflective side face 22. As illustrated in FIG. 6, such a filter assembly 110 replaces the AR-coating utilized to control the final internal reflection at side face 22 (which produces the image beam I) with a reflective element 112 in optical contact with the pentaprism 12. As a result, all reflections of the output beam I are produced by a transmissive structure (the retro-reflector 14 and the element 112) and the neutral performance of the filter is optimized.

Thus, a novel optical filter has been described that enables the delivery of an image with greatly attenuated power while providing a substantially neutral spectral performance. At the same time, the filter retro-reflects substantially all of the unused portion of the incoming light back toward the object along the original optical path of the incoming beam. As explained, this is achieved by the combination of multiple optical structures wherein different materials with indices of refraction that are as close as possible to one another (substantially the same, if possible) are used to reflect a minimum amount of light (the image beam) while refracting the rest toward a retro-reflecting configuration. In view of these functional objectives, it is clear that the material used in the optical structure first receiving the incoming beam needs to be as high-quality as possible in order maintain the quality of the image. As such, fused silica is the best available material. On the other hand, the quality of the other optical structures is less important, so long as the indices of refraction are substantially the same, because all retro-reflected light is dumped and does not affect the quality of the image produced by the device.

The invention has been shown and described with respect to certain preferred principles, embodiments and features. It is understood that these embodiments are representative of the subject matter broadly contemplated by the invention, and that the scope of the invention fully encompasses other embodiments which may become useful in the art. For example, different materials may be used that possess the required optical characteristics outlined above to practice the invention. Similarly, it is understood that in practice any reflective coatings and/or retro-reflector configuration or device other than described herein may be used within the scope of the invention.

Thus, while the invention has been shown and described in what are believed to be the most practical and preferred embodiments, it is recognized that departures can be made therefrom within the scope of the invention, which is therefore not to be limited to the details disclosed herein, but is to be accorded the full scope of the claims so as to embrace any and all equivalent apparatus and methods.

I claim:

1. A neutral-density optical-filter assembly for a solar telescope assembly comprising:

a first optical structure with a front face adapted to receive an incoming beam and with a first reflective face reflecting internally a fraction of the incoming beam, said fraction being directed as an output beam toward an image plane;

a second optical structure with a refracting facet in optical contact with said first reflective face of the first optical structure and with a second facet adapted to receive a first refracted fraction of said incoming beam propagating from said first reflective face;

a third optical structure with a third face in optical contact with said second facet of the second optical structure and adapted to receive a second refracted fraction of said incoming beam propagating from said second facet and to retro-reflect said second refracted fraction along an optical path of said incoming beam; and an anti-reflection coating between said first reflective face of the first optical structure and said refracting facet of the second optical structure;

wherein the first and second optical structures are made of different materials having substantially equal, but not identical, indices of refraction; the second and third optical structures are made of the same material; and the neutral-density optical-filter assembly is incorporated into a solar telescope and adapted to return said refracted fraction along said optical path of the incoming beam.

2. A neutral-density optical-filter assembly for a solar telescope assembly comprising:

a first optical structure with a front face adapted to receive an incoming solar beam and with a first reflective face reflecting internally a fraction of the incoming solar beam, said fraction being directed as an output beam toward an image plane;

a second optical structure with a refracting facet in optical contact with said first reflective face of the first optical structure and with a second facet adapted to receive a first refracted fraction of said incoming solar beam propagating from said first reflective face; and a third optical structure with a third face in optical contact with said second facet of the second optical structure and adapted to receive a second refracted fraction of said incoming solar beam propagating from said second facet and to retro-reflect said second refracted fraction along an optical path of said incoming solar beam;

wherein the first and second optical structures are made of fused silica materials having substantially equal, but not identical, indices of refraction; the second and third optical structures are made of the same material; and the neutral-density optical-filter assembly is incorporated into a solar telescope and adapted to return said refracted fraction along said optical path of the incoming solar beam.

* * * * *